(No Model.) 2 Sheets—Sheet 1.
L. SLOAN.
DISH WASHER.
No. 393,671. Patented Nov. 27, 1888.
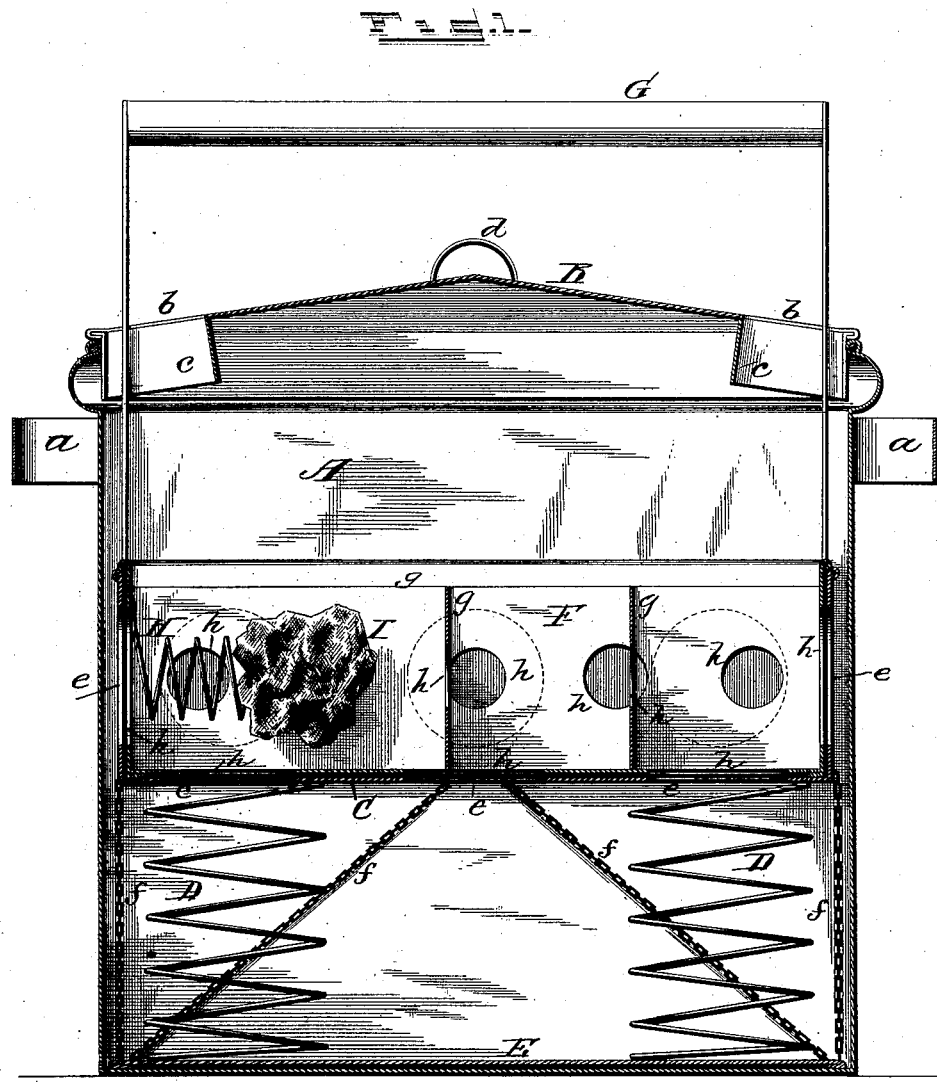
WITNESSES.
G. S. Elliott,
C. H. Cummings.
INVENTOR,
Lina Sloan.
per Chas. H. Fowler
Attorney.

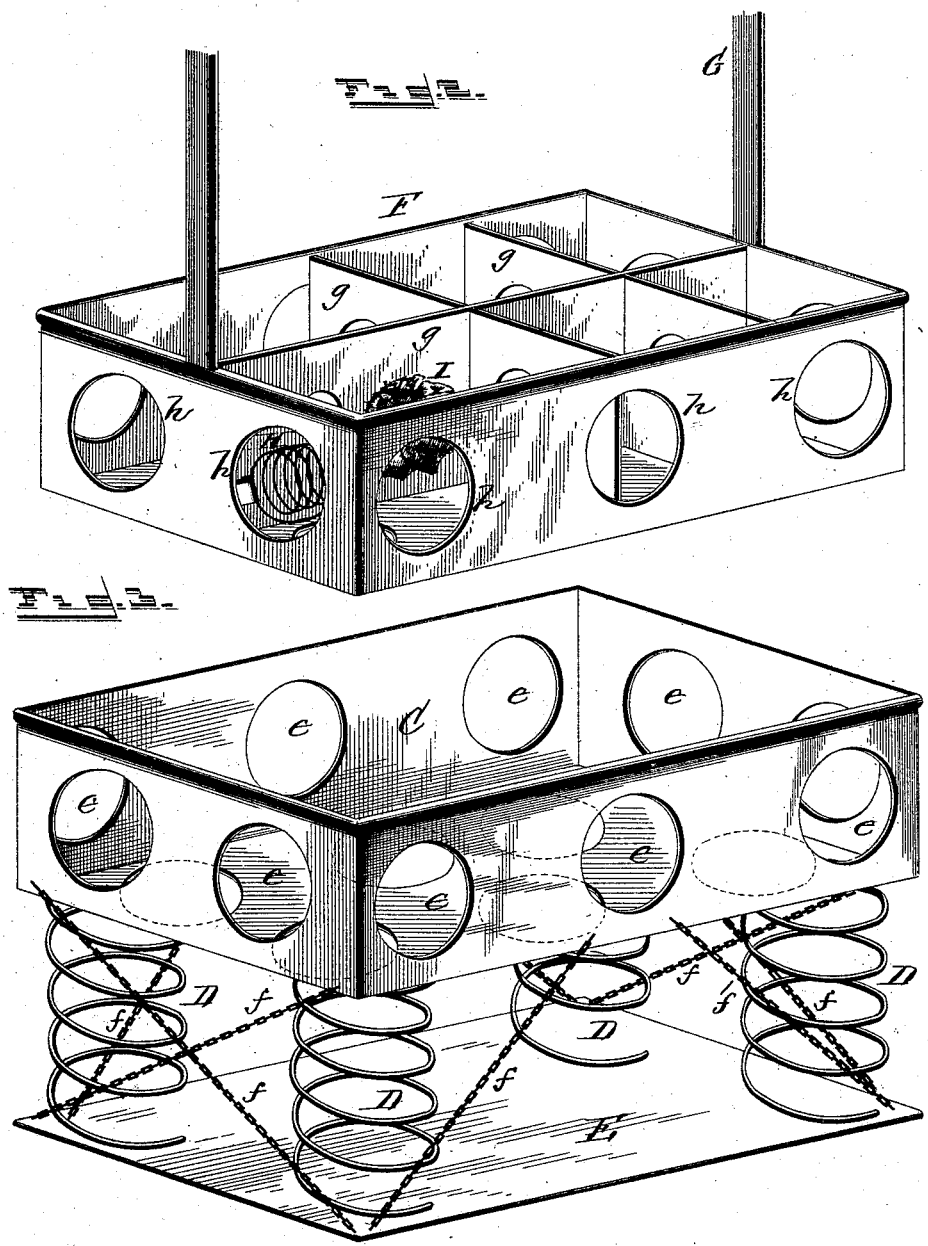

UNITED STATES PATENT OFFICE.

LINA SLOAN, OF WAUSAU, WISCONSIN.

DISH-WASHER.

SPECIFICATION forming part of Letters Patent No. 393,671, dated November 27, 1888.

Application filed March 27, 1888. Serial No. 268,661. (No model.)

*To all whom it may concern:*

Be it known that I, LINA SLOAN, a citizen of the United States, residing at Wausau, in the county of Marathon and State of Wisconsin, have invented certain new and useful Improvements in Dish-Washers; and I do hereby declare that the following is a full, clear, and exact description of the same, reference being had to the annexed drawings, making a part of this specification, and to the letters and figures of reference marked thereon.

Figure 1 of the drawings is a longitudinal section of my improved dish-washing machine; Fig. 2, a detail view, in perspective, of the basket for containing the dishes to be washed; and Fig. 3, a similar view of the tray and its connections, which fits and is placed in the boiler containing the water.

The present invention has relation to machines for washing dishes and other tableware, and the object thereof is to provide a simple and easily-operating device that will quickly and thoroughly wash and clean dishes, tumblers, and other table-ware without danger of breaking them, which objects I attain by the construction substantially as shown in the drawings and hereinafter described and claimed.

In the accompanying drawings, A represents the boiler or other receptacle for containing the hot water or suds, the same being of any suitable size and shape as found best adapted to the purpose, and has handles $a$ for lifting it, connected thereto at or near its top. This boiler or receptacle is provided with a cover, B, having openings $b$ extending out to the rim thereof, and the cover is strengthened at and around the openings by depending flanges $c$, said cover being provided with the usual handle, $d$.

Within the boiler A is located the tray C, which may be constructed of sheet metal, having holes $e$ therein, as shown; or it may be formed of wire, as found most preferable, and of any desirable size and shape. In the present instance I have shown the tray of sheet metal having openings through its bottom and sides, and the tray is supported at a suitable height by coiled springs D, one end of which is connected to the under side of the tray and the lower or opposite end being connected to a plate, E, as shown more clearly in Fig. 3.

Connected to the tray and to the plate are cords or chains $f$, which limit the extent to which the tray is moved or forced up by the springs when the pressure on the tray is removed.

The basket, as shown at F, is provided with a suitable handle for carrying and operating it, and like the tray may be constructed of sheet metal or of wire, as deemed most preferable, and is of any preferred size or shape, and may be variously modified in detail of construction so as to adapt it to the class of dishes to be washed or the different kinds of table-ware.

The basket I have shown as constructed of sheet metal, having partitions $g$ to divide it into several compartments to receive the different class of dishes to be washed. These partitions, as well as the sides and bottom of the basket, have perforations or openings $h$, and like the openings in the bottom and sides of the tray allow the water to freely circulate when the basket and tray are submerged in the water contained in the boiler A, which is accomplished by pressure on the handle. The basket being supplied with dishes and the boiler partially filled with water, with the tray in position, as shown in Fig. 1, the basket and tray are given a vertical reciprocating motion by means of the handle G until the dishes are well cleaned, when the basket can be removed and the dishes therein taken out and placed on a suitable rack in a convenient place for drying. Upon every downward stroke of the basket the springs will come into play to force it up. Thus, when the basket is forced down by the hand, the springs will automatically force the basket back, which gives to it a reciprocating or churning motion. This downward motion of the basket forces the water up against the dishes therein sufficiently to thoroughly clean them, and to insure the springs operating any suitable number may be used, and any well-known form of spring may be substituted for those shown. When glassware is to be washed, I provide the basket with a spring, H, to which is attached a sponge, I, so that the glasses will be rubbed when in contact therewith. Especially is this useful when glasses or tumblers are being washed.

It should be understood that when the basket and tray are given a churning motion, as previously described, the sponge, being attached to the spring, will have imparted to it a continuous rubbing motion against the exterior of the glasses, which are placed in the compartment of the tray with such relation to the sponge as to have some portion of it in contact with the outer surface of the glass without compressing the sponge.

When it is desired to more thoroughly clean the interior of the glasses, they are taken one by one and forced over the sponge and turned a few times, the spring to which the sponge is attached allowing the glass to be turned at any angle to bring the sponge in contact with any portion of the interior of the glass to complete the cleaning.

Having now fully described my invention, what I claim as new, and desire to secure by Letters Patent, is—

1. In a dish-washing machine, the combination, with a suitable boiler or receptacle for containing the water and a suitable basket for holding the dishes or other table-ware, of a tray and plate and springs and cords or chains connected to the plate and to the tray, substantially as and for the purpose specified.

2. In a machine for washing table-ware, a suitable boiler or receptacle for containing the water and a tray supported on springs and adapted to have a vertical reciprocating motion, in combination with a basket provided with a spring having a sponge attached thereto, substantially as and for the purpose specified.

In testimony that I claim the above I have hereunto subscribed my name in the presence of two witnesses.

LINA SLOAN.

Witnesses:
E. EDWARDS,
P. F. CURRAN.